May 30, 1972 T. O. PAINE 3,666,566

ADMINISTRATOR OF THE NATIONAL AERONAUTICS
AND SPACE ADMINISTRATION

THERMALLY CASCADED THERMOELECTRIC GENERATOR

Filed July 24, 1969 3 Sheets-Sheet 1

INVENTOR
ROBERT FLAHERTY

BY

ATTORNEYS

INVENTOR
ROBERT FLAHERTY
BY
ATTORNEYS

May 30, 1972 T. O. PAINE 3,666,566
ADMINISTRATOR OF THE NATIONAL AERONAUTICS
AND SPACE ADMINISTRATION
THERMALLY CASCADED THERMOELECTRIC GENERATOR
Filed July 24, 1969 3 Sheets-Sheet 3

INVENTOR
ROBERT FLAHERTY
BY
ATTORNEYS

United States Patent Office
3,666,566
Patented May 30, 1972

3,666,566

THERMALLY CASCADED THERMOELECTRIC GENERATOR

T. O. Paine, Administrator of the National Aeronautics and Space Administration, with respect to an invention of Robert Flaherty, Pittsburgh, Pa.

Filed July 24, 1969, Ser. No. 844,355
Int. Cl. G21h *1/10;* H01v *1/02*
U.S. Cl. 136—202 15 Claims

ABSTRACT OF THE DISCLOSURE

A thermally cascaded thermoelectric generator is disclosed. The generator includes a first stage containing high-temperature thermoelectric elements and a second stage containing lower temperature thermoelectric elements. The stages are connected in thermal series by means of an elongated heat transfer pipe containing a liquid metal and a wick. A portion of the heat radiated to the first stage from a high-temperature radioisotope source is converted to electricity. The heat rejected by the first stage is conducted to the heat pipe and absorbed by the liquid metal as latent heat of vaporization. The vapor rises to the second stage and condenses to give up latent heat of condensation which is transferred to the second stage and is converted to electricity therein. The condensed liquid returns on the wick to the vicinity of the first stage.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

(1) Field of the invention

The present invention relates to a thermoelectric generator and more particularly this invention relates to a generator utilizing a high-temperature thermoelectric material in thermal series with a low-temperature thermoelectric material.

(2) Description of the prior art

Electrical generating systems that can be utilized in isolated and remote environments would find use in powering life support and instrument systems in space or underwater exploration and surveillance or to power remotely located radar or telemetering systems on land or sea. The thermoelectric effect has been known for a long time and self-contained and sufficient thermal power sources such as solar concentrators or radioisotopic fuel elements are available. However, thermoelectric couples have not been the subject of many practical devices for several reasons. Prior development effort has mainly been directed to fundamental material studies, fabrication methods and production of a limited number of devices for special purpose applications. Only within the last few years have the problems of fabricating reliable devices been solved. Furthermore, the power to weight ratio has not been very large which has made these devices unattractive for use in space applications.

Almost from the discovery and initial use of the thermoelectric effect it has been recognized that there is no ideal thermoelectric material. Rather the known thermoelectric materials are each most efficient in converting heat into electricity at a special temperature and can be ranked accordingly on the basis of their individual "Figure of Merit."

It would appear that the serial combination of a high-temperature thermoelectric material and a low-temperature thermoelectric material would be more effective in converting heat to electricity than either type of generator alone. Unfortunately, the chemical and mechanical properties of these materials are greatly different and a simple series arrangement appears impractical because of mechanical incompatibility in fabrication and chemical incompatibility in operation.

OBJECTS AND SUMMARY OF THE INVENTION

It is therefore an object of this invention to provide a thermoelectric generator having a high conversion efficiency.

A further object of this invention is to fabricate a reliable and efficient thermoelectric generator utilizing a high-temperature thermoelectric material in thermal series with a low-temperature thermoelectric material.

Yet another object of the invention is to increase the specific power of a radioisotope fueled thermoelectric generating plant.

A still further object of the invention is the provision of a thermally cascaded thermoelectric generator utilizing both high and low temperature thermoelectric devices which is more effective in converting heat to electricity than either type of device alone.

Yet another object of the invention is the provision of a series arrangement of diverse type of thermoelectric materials in a chemically and mechanically compatible arrangement.

These and other objects and many attended advantages of the invention will become apparent as the description proceeds.

The thermally cascaded thermoelectric generator according to the invention comprises an arrangement including heat transfer means having a hot end and a cold end and a thermal heat source. A first generating stage including a high-temperature thermoelectric material is disposed with its cold end in heat conducting contact with the hot end of said heat transfer means and the hot end of said stage spaced from said source. A second generating stage including a low-temperature thermoelectric material has a hot end disposed in heat conducting relationship with the cold end of said heat transfer means and a cold end of said second stage associated with means for rejecting excess heat from said second stage. All parts of the generator are thermally in series so that each stage operates in the temperature range that it is most effective in converting heat directly into electricity.

The invention will now become better understood by reference to the following detailed description when considered in conjunction with the accompanying drawings.

DESCRIPTION OF THE PREFERRED EMBODIMENTS

Figure 1:
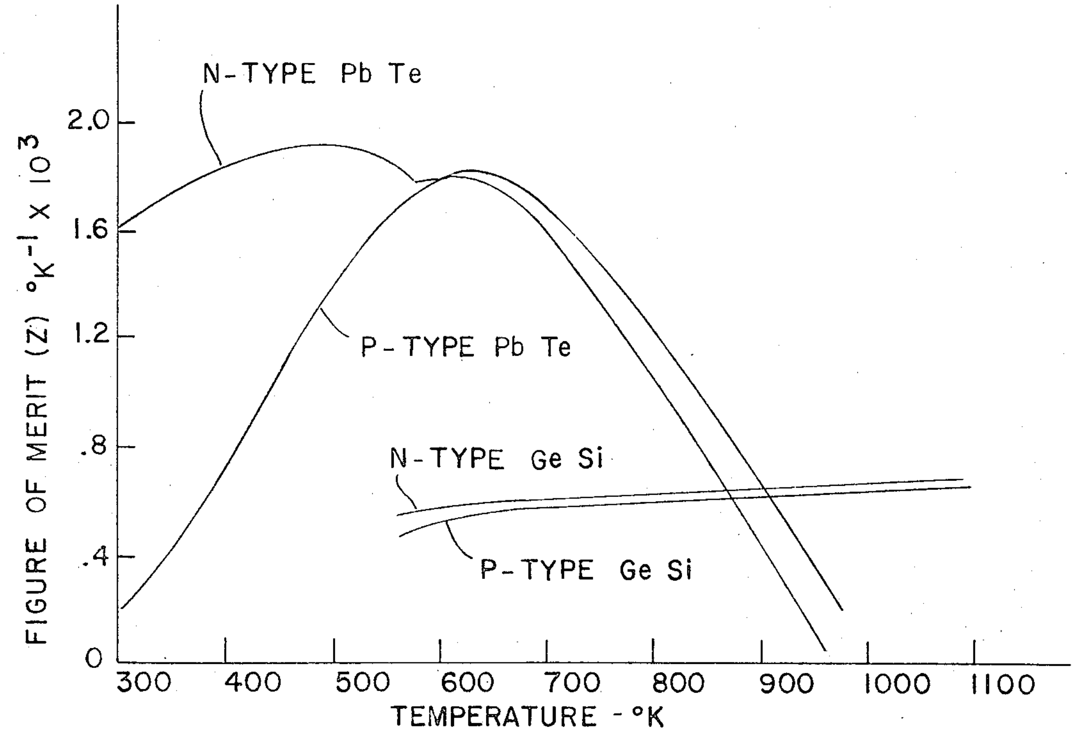
FIG. 1 is a graph of the Figure of Merit, Z, of the thermoelectric materials as ordinate versus temperature in ° K. as abscissa.

Referring now to FIG. 1, the Figure of Merit, Z, for a representative high-temperature material such as Si-Ge and a low-temperature material such as Pb-Te are displayed. The Figure of Merit, Z, equals $\alpha^2/\rho K$ in which $\alpha$ is the Seebeck coefficient, $\rho$ is electrical resistivity of the material and K is the thermal conductivity. All the physical properties which determine the Figure of Merit vary with temperature and therefore Z also varies with temperature. FIG. 1 shows this variation for n- and p-type Si-Ge and Pb-Te materials which have sufficiently large Figures of Merit to be applicable in practical devices for the direct conversion of heat to electricity.

The temperatures ranges of superiority of these two materials separate them into two distinct classes of application. Pb-Te is most applicable in situations in which the heat source temperature is low and where the high conversion efficiency of the material off-sets the low thermal efficiency of the system. Si-Ge having a high-thermal efficiency and a low conversion efficiency is most applicable when the heat source temperature is high and thermal efficiency is sacrificed in favor of low weight. Theoretically, increased efficiency should be attained by supplying heat from a high-temperature source to Si-Ge thermocouples, rejecting heat to Pb-Te thermocouples at a temperature of 850 to 950° K., at which the Figure of Merit curves cross, and rejecting heat from the Pb-Te thermocouples at a temperature of about 480° K., a temperature below which heat rejection becomes difficult.

Due to chemical and mechanical incompatibility of these materials a simple series arrangement is impractical. Furthermore, the most efficient configuration for each is completely different. For example, Pb-Te is most efficient when provided in a completely enclosed void free structure, for example, in the form of a tubular generator, while Si-Ge is best used in an arrangement of discrete and separated pellets.

Figure 3:
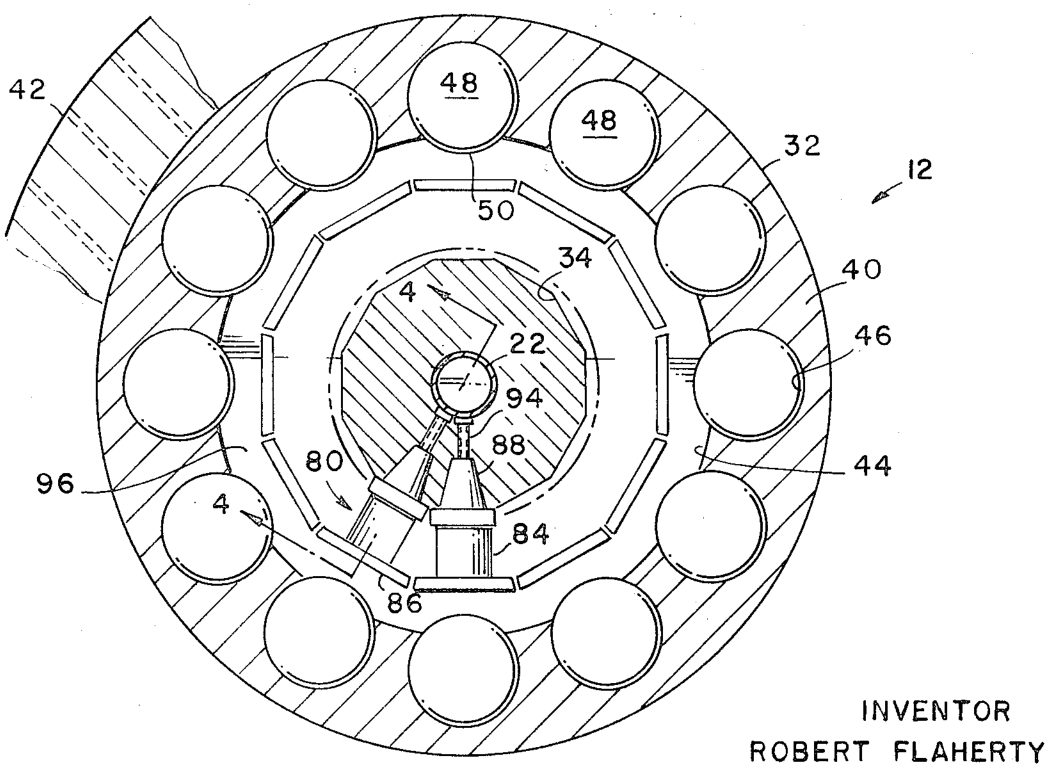
FIG. 3 is a sectional view taken along the line 3—3 of FIG. 2.
Figure 2:
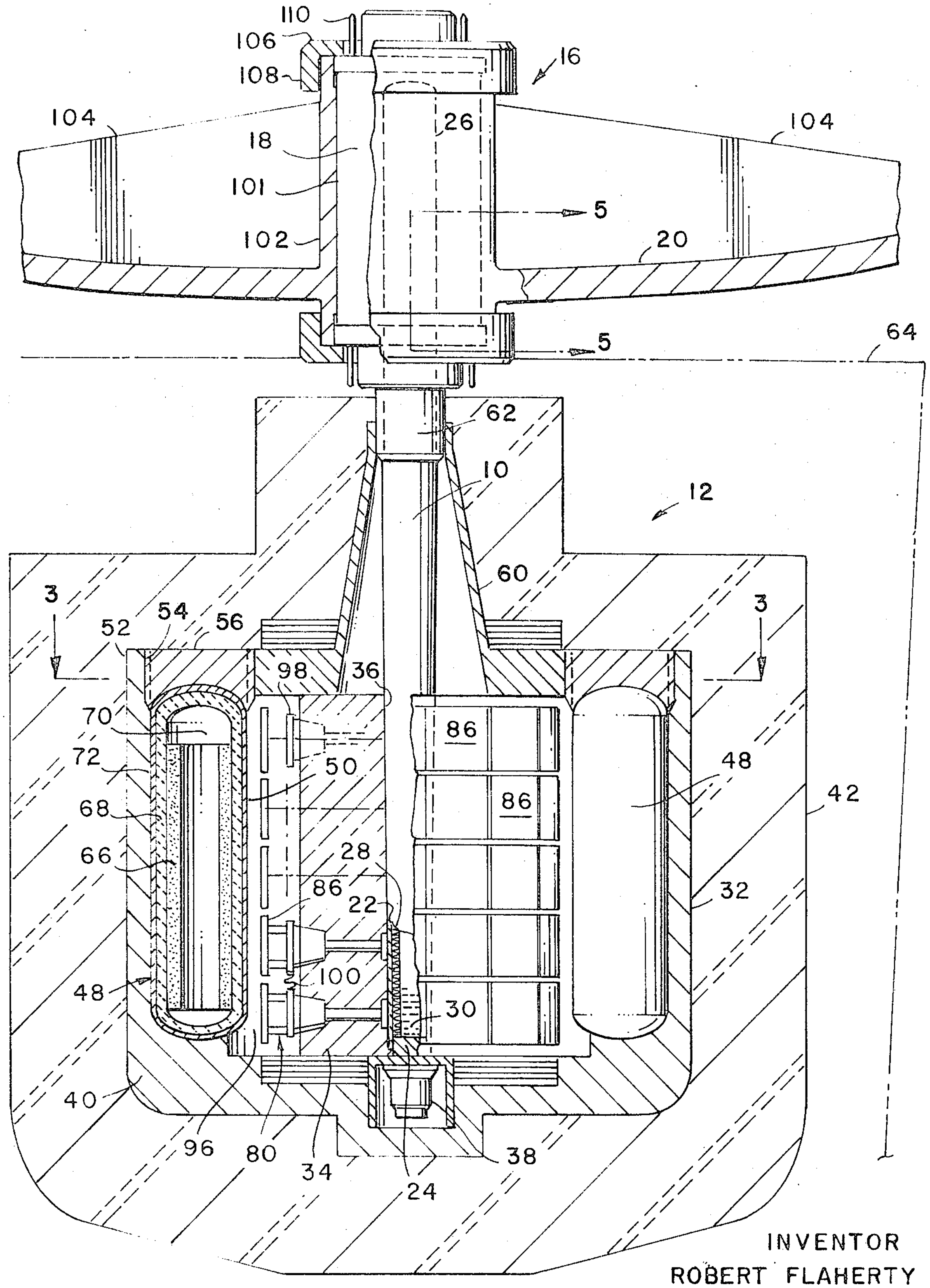
FIG. 2 is a front plan view partly in section of an embodiment of the thermoelectric generator of the invention.

Referring now to FIGS. 2–3, the thermally cascaded thermoelectric generator according to the invention includes an elongated high-thermal conductivity heat transport member 10 having a hot end and a cold end. The cold end of a first high-temperature thermoelectric generating stage 12 surrounds the hot end of the heat transfer member 10 and a high-temperature heat source is disposed adjacent the hot end of the stage 12. A second thermoelectric generating stage 16 comprising an annular member 18 is in thermal contact with the cold end of transfer member 10. A heat rejection radiator 20, is in contact with the outer surfaces of the cold end of the second stage 16.

The heat transfer member 10 is a hollow tubular shell 22 having a closed bottom end 24 and a closed top end 26. The interior wall of the shell is lined with a capillary wick 28 formed of a stainless steel mesh and the wick is saturated with a fluid 30 which has an appreciable vapor pressure within the operating temperature range of the heat transfer member 10. Heat can thus be transported axially as the latent heat of vaporization of the fluid. In the evaporating zone of the transport member 10, the outer surface of the shell 22 acquires heat from the first stage 12 which is absorbed by the fluid 30 as latent heat of vaporization. The vapor fills the central void of the heat transfer member 10 and condenses in the condenser zone of the transport member 10 as heat is delivered to the second stage 16 as latent heat of condensation of the fluid; this condensation causes a pressure difference in the vapor which induces vapor flow from the evaporating zone to the condensing zone of the heat transfer member 10. Capillary flow in the wick 28 returns the fluid to the evaporating zone where it is again converted to vapor by the addition of heat.

The first stage 12 includes a housing 32 having an upstanding annular central cold frame 34 and an outer hot frame portion 40. The hot end of heat transport member 10 is received in a central bore 36 extending through the cold frame 34. The bottom end 24 of the shell 22 extending outside of the cold frame 34 is threaded and a nut 38 secures the shell 22 to the cold frame 34.

The cold frame 34 is spaced from the outer hot frame

40. The interior periphery 44 of the hot frame 40 contains a plurality of equally spaced partial cylindrical recesses 46. A cylindrical radioisotopic fuel capsule 48 is received in each recess 46 such that a portion of the outer cladding 50 of the capsule is exposed to the cold frame 34. The outer portion 52 of the top of housing 32 over the hot frame is provided with an access port 54 above each capsule recess 46 and a removable cover 56 is disposed in each port. The inner portion of the top 52 comprises a hollow conical support 60 which is attached at its upper end to a collar 62 engaging the mid-portion of heat transfer shell 22.

The exterior of the housing 32 is encapsulated in a jacket 42 of thermal insulation. The recess 46 surrounding each capsule 48 acting as a radiation reflector and the thermal insulation surrounding the housing 40 reduce heat losses through parasitic thermal paths parallel to the first stage 12 of the generator. The surface of the recess may be coated with a highly reflective gold coating to further minimize heat loss. If the generator is to be used in a space mission where protection of the radioisotope during reentry of the earth's atmosphere is required, the outermost shell of insulation can be adapted to serve as a reentry aeroshell 64.

The fuel capsule 48 includes an annular shaped radioisotopic fuel element 66 encapsulated in a longer refractory alloy shell 68 to provide a central and upper void 70 for accumulation of helium, the decay product of an alpha-particle emitting radioisotope. The exterior of the shell 68 is clad with an oxidation and corrosion resistant cladding 72. The capsule 48 must be capable of heating the first stage to a temperature above the temperature at which the second stage has a higher conversion efficiency than the first stage, i.e., the temperature at which the Figure of Merit curves cross in FIG. 1.

Figure 4:
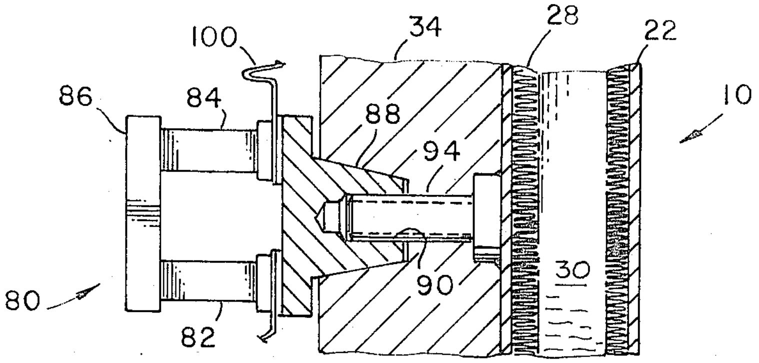
FIG. 4 is an enlarged view of a Si-Ge thermocouple.

The generation portion of the first stage 12 is in the form of an array of high-temperature thermocouples 80. Referring now to FIG. 4 it is seen that the thermocouples 80 include two separated discrete thermoelectric n- and p-type pellets 82, 84 for example Si-Ge. The hot end of the couple 80 is paved with a hot shoe 86 suitably of tungsten. The cold end of the couple is attached to a heat sink 88 having a conical periphery, which is provided with a central threaded recess 90 on its outer face.

The couples 80 are seated in correspondingly shaped recesses in the cold frame 34 and are drawn down and held into the frame in good thermal contact with the boiler end of the shell 22 of the heat transport member 10 by means of bolts 94 extending through the cold frame 34 and engaging the theaded recesses 90 in the conical heat sink 88 of the couples 80. The array of couples project from the cold frame like quills and are spaced from the fuel across a radiation gap 96. The gap 96 not only prevents restraining forces from acting on the hot end of the couples 80 which are quite vulnerable to bending moments but provides a convenient interface for separating the radiant heat source from the remainder of the generator.

The couples 80 receive heat by absorption of radiation on the hot shoe 86 transmitted across the radiation gap 96 without mechanical contact with the heat source. The array of couples 80 may be completely electrically independent of the second generation stage 16. The couples in each column 98 facing a fuel capsule 48 may be arranged in electrical series by connecting n- and p-type pellets 82, 84 from adjacent couples with a conducting copper strap 100 to form twelve separate low voltage paths. Alternatively the rows of couples 80 may be interconnected with the columns to form one higher voltage power source.

The second or basic generator stage 16 comprises an annular tubular housing 18 surrounding the cold end or condensor zone of the heat transport member 10. The housing contains a plurality of alternating p- and n-type wafers of a lower temperature thermoelectric material such as Pb-Te. The housing 18 is surrounded by a heat sink radiator 20 comprising sleeve 102 on which is supported a plurality of heat conducting fins 104 which form a heat sink to reject heat from the second stage 16. The radiator is attached to the housing 18 and the shell 22 of the transport member by means of an annular retainer 106 having a lip 108 extending over the top and bottom of sleeve 102. Electrical connector studs 110 extend from the generator 16 through the retainer 106.

Figure 5:
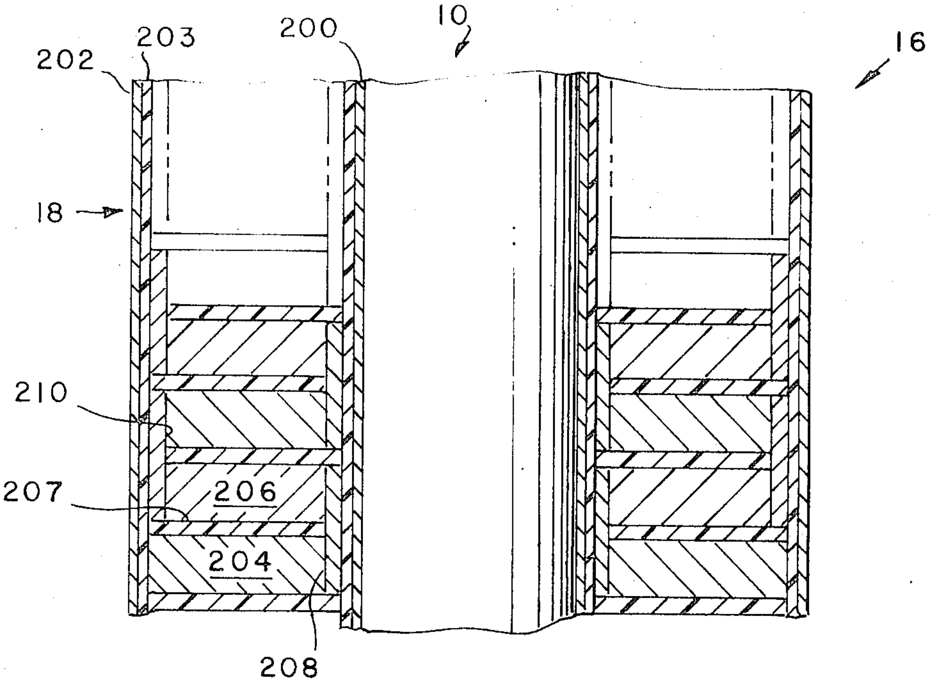
FIG. 5 is an enlarged view of a Pb-Te tubular generator stage.

Referring now to FIG. 5 for a more detailed description of the second stage generator. The generator comprises an annular shell 18 having an inner wall 200 and an outer wall 202. The inner surface of outer wall 202 and the outer surface of inner wall 200 are covered with thin electrically insulating sleeves 203 of a material such as boron nitride. Wafers 204, 206 of n- and p-type low-temperature thermoelectric material are stacked along the length of the concentric inner and outer walls 200, 202 with n- and p-type wafers alternating. A washer 207 of electrical insulating material such as mica is disposed between each pair of adjacent wafers. Inner conductive sleeves 208 alternate with outer conductive sleeve 210 each in contact with adjacent n- and p-type wafers such that a continuous series path is provided through the stack of wafers. The thermocouples, comprising adjacent n- and p-type wafers, are electrically in series axially; however, they are in parallel thermally, heat being removed from the outer cylindrical surface by the radiator fins 104 after being delivered to the inner surface of the inner wall 200 by the latent heat of condensation of the vapor condensing inside the shell 22 of heat transport pipe 10.

In a more specific embodiment of the invention the fuel element comprises plutonium-238 in the form of plutonium dioxide encapsulated in a tantalum alloy shell which was clad with an oxidation and corrosion resistant platinum cladding. Energy is released in the fuel as the kinetic energy of α-particles which are fully ionized helium nuclei. The kinetic energy of the α-particles is converted into thermal energy in the fuel as the α-particles are stopped by multiple collisions in the plutonium dioxide crystal lattice. Eventually these helium nuclei acquire electrons becoming helium atoms and diffuse out of the fuel collecting in the void provided for this purpose inside each fuel capsule.

Thermal energy is transferred by conduction to the refractory alloy containment shell then through it and the oxidation resistant cladding. A group of fuel capsules, for example twelve, are arranged in a cylindrical array.

The capsules are spaced across a radiation gap from the first thermoelectric generating stage, since the pellets of Si-Ge thermoelectric material are quite fragile and their coefficient of expansion differs substantially from that of the fuel capsule. Furthermore, for ease of replacement of the capsules and of the high temperature thermocouples it is desired to separate them completely and to rely on radiation for transfer of heat and avoid conduction through any mechanical interconnection.

The heat generated in the capsules is transferred as thermal radiation to the first stage thermoelectric generator located inside the cylindrical array of capsules. The first thermoelectric generator stage comprises an array of silicon-germanium thermocouples, the cold ends of which are inserted into a cold frame which surrounds the vaporizer zone of the heat pipe and are cooled by it. They project from this cold pipe like quills. The outboard ends of the thermocouples are paved with rectangular tungsten hot shoes which absorb the thermal radiation transferred without mechanical contact across the radiation gap. Heat generated in the tungsten shoes is conducted radially inward through the thermoelectric couples which convert a portion of the heat directly into electricity. Five couples are disposed opposite each fuel capsule to form a row and the thermocouples in each row are connected in series to provide 12 separate low voltage generating paths.

The fuel capsules are capable of generating a temperature greater than 1000° K. and usually above 1200° K. However, referring again to FIG. 1, it is desirable to reject heat at a temperature below about 950° K. to the second stage. The cold frame accepts the excess heat from the first stage thermocouples and delivers it to the boiler zone of the heat pipe fitted into its central bore.

Heat at a temperature of about 950° K. in conducted inward through the wall of the heat pipe and is absorbed by the sodium liquid which saturates the capillary stainless steel mesh. The sodium liquid vaporizes in the evaporating zone.

Heat is transported by the sodium vapor to the condenser end of the heat pipe where the sodium vapor condensed upon the wick and the heat deposited in the wick is conducted radially outward through the heat pipe wall and is transferred radially to the tightly fitting inner wall of a Pb-Te tubular thermoelectric generator stage. The temperature loss through the pipe is about 50° K. and as heat is conducted from the surface of the pipe radially outwardly through the tubular generator a portion of the heat is converted directly into electricity and there is a temperature drop to about 480° K. The tubular thermoelectric generator is tightly fitted into a conductive radiator. The heat delivered at the outer surface of the tubular generator is distributed by conduction to the exposed surfaces of the radiator and is radiated into space.

From the foregoing description it is apparent that the thermal impedances of all components of the systems must be matched with care so that the components operate at temperatures optimum for the system and not for the individual stages or components thereof. When properly constructed the system produces approximately 50% more power than produced by either stage alone.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A thermally cascaded, thermoelectric generator comprising:

heat transfer means comprising an elongated, closed, hollow, tubular member containing a liquid vaporizing at a temperature intermediate a first higher temperature and a second lower temperature for transferring heat between the ends of said member;

a first thermoelectric generating stage including a plurality of thermoelectric couples, each formed of a pair of n- and p-type thermoelectric semiconductor elements and having high thermal efficiency and low thermoelectric conversion efficiency at said first temperature, said couples each having a hot end and a cold end and being annularly arranged with respect to the axis of said tubular member adjacent a first end thereof with the cold end of said couples disposed inwardly toward said tubular member and the hot end of said couples facing outwardly;

thermal heat source means annularly and coaxially disposed with respect to said first stage to radiate heat to the hot end of said first stage couples; and a second thermoelectric stage including a plurality of thermoelectric couples, each formed of a pair of n- and p-type thermolectric semiconductor elements different than said first stage elements and having a high thermoelectric conversion efficiency and low thermal efficiency at said second temperature; said couples each having a hot end and a cold end and being annularly arranged with respect to the axis of the tubular member adjacent a second end thereof with the hot end of said couples disposed toward said tubular member and the cold ends facing outwardly.

2. A thermoelectric generator according to claim 1 further including annular heat sink means disposed coaxially with respect to said second stage for removing heat from the cold end of said second stage couples.

3. A thermoelectric generator according to claim 1 in which said heat source includes a radioisotopic fuel.

4. A thermoelectric generator according to claim 1 in which said hollow tubular member further includes a capillary wick for said fluid disposed adjacent the inner wall of said tubular member.

5. A thermoelectric generator according to claim 1 in which the hot end of each first stage couple is spaced from said heat source and the cold end of each first stage couple is in firm thermal contact with the hot end of said elongated heat transfer member.

6. A thermoelectric generator according to claim 5 in which a plurality of said first stage couples are connected in electrical series.

7. A thermoelectric generator according to claim 5 in which said first stage couples each include n- and p-type Si-Ge thermoelectric elements.

8. A thermoelectric generator according to claim 5 in which said second stage includes a plurality of annular wafers of said different thermoelectric material disposed around the colder end of said elongated heat transfer means.

9. A thermoelectric generator according to claim 8 in which said wafers comprise alternating n- and p-type conductivity Pb-Te thermoelectric elements, and an electrically insulating washer being disposed between each wafer.

10. A thermoelectric generator according to claim 9 in which conductive rings are provided in contact with the inner periphery of a pair of adjacent wafers and the outer periphery of a pair of adjacent wafers, said inner and outer rings alternating to connect all of said wafers in electrical series.

11. A method of generating electricity comprising the steps of:

establishing a high temperature heat source;

radiating heat from this source to the hot end of a plurality of thermocouples forming a first thermoelectric generator stage, said thermocouples each including a pair of n- and p-type conductivity thermoelectric semiconductor elements and having high thermal efficiency and low thermoelectric conversion efficiency at said high temperature to convert a portion of said heat to electricity;

rejecting heat from the cold end of said first stage couples and transferring said heat by means of an elongated, closed, tubular member having a first end axially disposed adjacent the cold end of an annular array of said couples and containing a liquid vaporizing at a temperature intermediate said high temperature and a second lower temperature to the hot end of the thermoelectric couples of a second thermoelectric generator stage, said second stage couples being annularly and axially arranged around the second end of said tubular member and each of said couples containing a pair of n- and p-type thermoelectric, semiconducting elements different from said first stage elements and having a high thermoelectric conversion efficiency and low thermal efficiency at said second temperature and converting a further portion of said heat to electricity; and rejecting heat from the cold end of said second stage couples.

12. A method according to claim 11 in which said elongated tubular member is closed and contains a liquid vaporizing appreciably at a temperature below the temperature in said first stage and above the temperature of said second stage so that said heat is transferred by boiling and condensing said liquid.

13. A method according to claim 12 in which said first stage thermoelectric comprises silicon-germanium, said second stage thermoelectric comprises lead-tellurium and said liquid is sodium.

14. A method according to claim 11 in which said heat source includes a radioisotopic fuel.

15. A thermoelectric generator comprising:

an elongated high thermal transport heat transfer member having a hot end and a cold end comprising a closed tubular member containing a liquid vaporizing at a temperature below a first temperature of said hot end and above the second temperature of said cold end;

a first thermoelectric stage including a housing, said housing including an outer hot frame portion receiving a plurality of radioisotopic fuel capsules spaced from an inner cold frame member disposed around the hot end of said heat transfer member;

a plurality of high temperature thermocouples having a cold end supported in said cold frame member and a hot end spaced from said capsules said couples being annularly and axially disposed with respect to said tubular member, said couples each including a pair of n- and p-type semiconducting elements and having high thermal efficiency and low thermoelectric conversion efficiency at said first temperature;

a second thermoelectric stage comprising an annular tubular container in contact with the outer surface of the cold end of said heat transfer member; and a plurality of annular thermoelectric elements received over the cold end of said tubular heat transfer member and contained within said tubular container said elements being alternating n- and p-type semiconductor elements, different from said stage elements and having a high thermoelectric conversion efficiency and a low thermal efficiency at said second temperature.

References Cited

UNITED STATES PATENTS

| | | | |
|---|---|---|---|
| 2,986,009 | 5/1961 | Gaysowski | 136—204 X |
| 3,211,586 | 10/1965 | McCoy et al. | 136—202 |
| 3,296,034 | 1/1967 | Reich | 136—212 |
| 3,342,567 | 9/1967 | Dingwall | 136—239 X |
| 3,451,641 | 6/1969 | Leventhal | 136—202 X |

CARL D. QUARFORTH, Primary Examiner

H. E. BEHREND, Assistant Examiner

U.S. Cl. X.R.

136—208, 204, 239; 165—105